Figure 1:
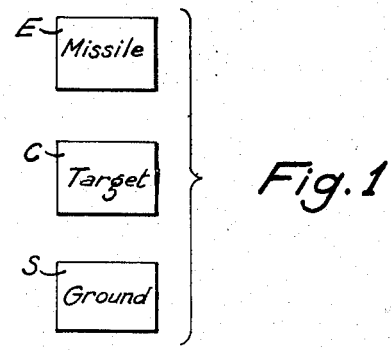

Sept. 7, 1965  A. ROBERT ETAL  3,205,494
MISS-DISTANCE INDICATOR
Filed Jan. 31, 1962  2 Sheets-Sheet 2

United States Patent Office 3,205,494
Patented Sept. 7, 1965

3,205,494
MISS-DISTANCE INDICATOR
André Robert, Faubonne, and Albert Antoine Parrot, Suresnes, France, assignors to Sud-Aviation Société Nationale de Constructions Aéronautiques, Paris, Seine, France
Filed Jan. 31, 1962, Ser. No. 170,152
Claims priority, application France, Feb. 9, 1961, 852,121, Patent 1,288,180
9 Claims. (Cl. 343—6.5)

It is known to measure the distance between two bodies of which at least one may be in motion by a radio wave transmitter/receiver assembly which is rigid with one of the two bodies and is adapted to receive a signal transmitted by the other body. On receiving such a signal, this assembly transmits a new signal which is received by the other body and which, as is well known to those skilled in the art, allows the distance separating the two bodies to be deduced from the time of travel back and forth therebetween.

With a view to providing for the measurement, at a given point, of the distance between two bodies of which at least one is in motion, this invention has for its object to provide a miss-distance indicator for carrying into practice a method of measuring distance whereby there is transmitted, from one of the bodies toward the other and toward the given measurement point, a carrier wave which is amplitude-modulated by a sub-carrier which is in turn amplitude-modulated at the Doppler beat frequency between the transmitted wave and the echo wave retransmitted by the other body, and there is received, at said given measurement point, one of the sidebands of the carrier wave which is amplitude-modulated at the said Doppler frequency.

According to the present invention, said miss-distance indicator comprises, on one of the two bodies, a transponder consisting of a super regenerative oscillator which is connected to an antenna and the oscillations from which are chopped by a chopping generator. On the other body there is an ultra-high frequency oscillator which is connected to an antenna and the signals from which are amplitude-modulated by a high frequency oscillator whose signals are in turn amplitude-modulated by the voltage resulting from detection of the Doppler beat set up between the waves emitted by the ultra-high frequency oscillator and those re-emitted by the super regenerative oscillator, said voltage being supplied by a detector fed through the instrumentality of an oscillator tuned to the chopping frequency and receiving its signals from a detector of the signals emitted by the two oscillators. At said given measurement point, a receiver connected to an antenna and tuned to the frequency of one of the sidebands of the waves emitted by the ultra-high frequency oscillator, the output voltage of said receiver being applied to a measuring unit.

This invention further has for its object the industrial applications of the method and device hereinbefore disclosed, and in particular such applications as are adapted to determine the distance between a missile and a target thereof, or the distance of passage of any moving body such as an artificial satellite, either in relation to another moving object, or in relation to a fixed ground station which may be regarded as the second body and which may comprise both the amplitude-modulated transmitter/receiver assembly and the receiver assembly feeding the measuring unit.

The description which follows with reference to the accompanying drawings, filed by way of example only and not of limitation, will give a clear understanding of how the invention may be carried into practice and will disclose other particularities thereof.

Figure 2:
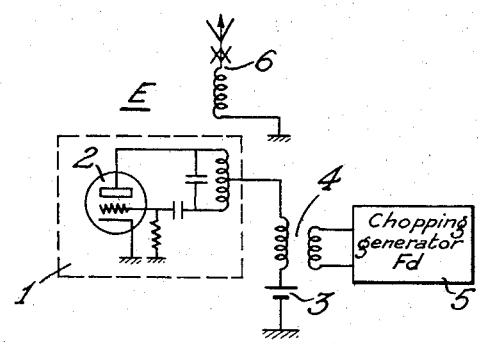
Figure 2:
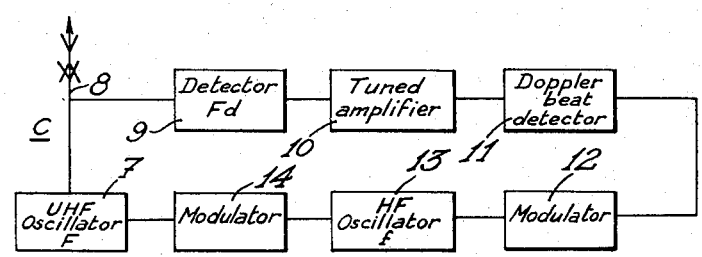
Figure 2:
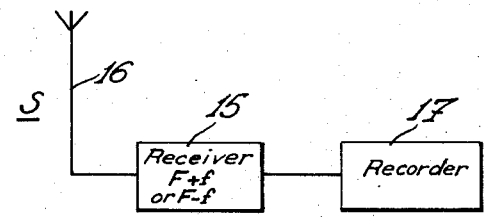
Figure 4:
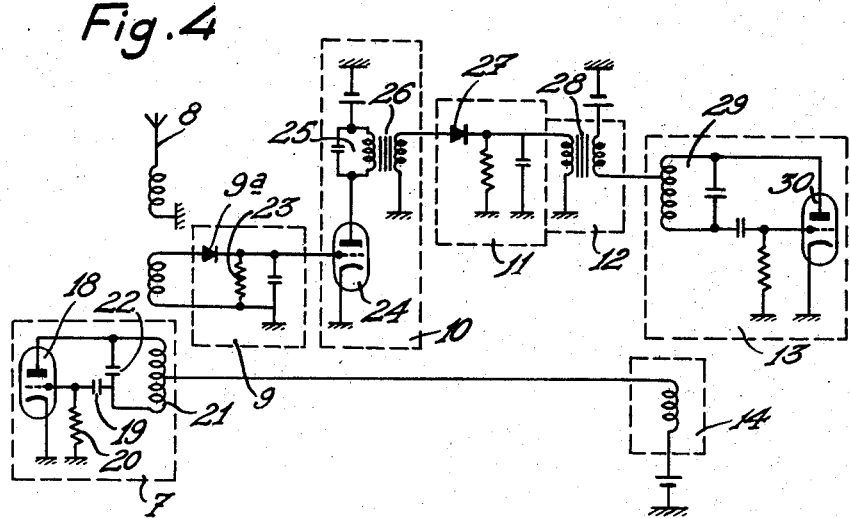
Figure 3:
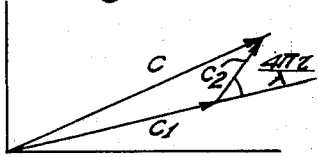
Figure 5:
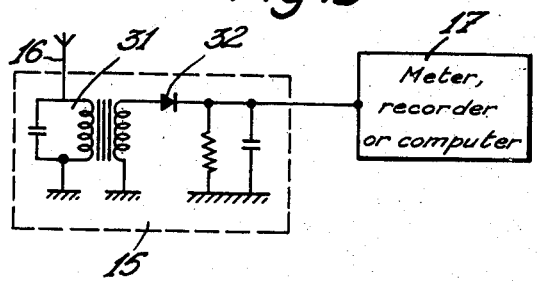
Figure 6:
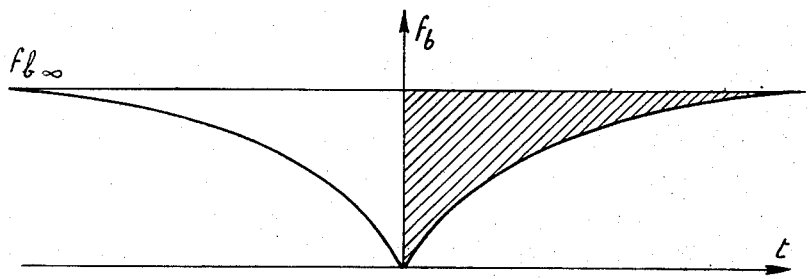

In the drawings:
FIG. 1 is a block diagram showing the two bodies between which the distance is to be measured, to wit the target and the missile, and the ground measurement station;
FIG. 2 schematically illustrates the radio equipment of the missile E, the target C and the ground measurement station S;
FIG. 3 is a Fresnel diagram showing the existence of a beat phenomenon between the wave transmitted by the target and the wave retransmitted by the missile toward the target;
FIG. 4 is a detailed diagram of the target radio equipment;
FIG. 5 is a detailed diagram of the radio equipment of the ground measuring instrument; and
FIG. 6 is a waveform of Doppler frequency versus time.

The various figures represent the specific instance wherein it is required to determine, at a point S on the ground, the distance between a tracking missile E and a target C which the same is seeking to attain. Of course, it will be understood that this invention is by no means limited to this specific example, but that it generally relates to the determination, at a given point, of the distance between two bodies, of which at least one is in motion.

The radio equipment in the missile (see FIG. 2) comprises a transponder consisting of a super regenerative ultra-high frequency oscillator 1 of natural frequency F equipped with a triode 2 the anode voltage supplied by a source 3 of which is sufficiently low for said oscillator to be maintained below the limit at which its oscillations start. Through the instrumentality of a transformer 4, there is superimposed upon the anode voltage supplied by the source 3 a periodic voltage of chopping frequency Fd supplied by a chopping generator 5 so as to raise said anode voltage close to the level at which the oscillations start. Chopping generator 5 is merely a power amplifier operating at a frequency lower than the super regenerative amplifier and having an output of sufficient magnitude so that at its output peaks it can raise the anode voltage of triode 2 to the desired level. The system as a whole is connected to a receiving/transmitting antenna 6. In the absence of any signal, the oscillator 1 operates incoherently, but the pulses it emits may be synchronized by an external voltage having a frequency close to the natural frequency F of the oscillator. As soon as a signal of that frequency is received by the transponder, the oscillations will be started and, as is well known, be in phase with the incident voltage at the leading edge of each pulse.

The radio equipment on the target C (see FIG. 2), comprises ultra-high frequency oscillator 7 which transmits waves of frequency F and is connected to a receiving/transmitting antenna 8. The signals emitted by the UHF oscillator 7 and those echoed by the transponder oscillator 1 are intercepted by the antenna 8 and applied to a detector 9 which furnishes a periodic signal the frequency of which is equal to the chopping frequency Fd. This signal is amplified in an amplifier 10 tuned to the frequency Fd and then transmitted to a second detector 11 which furnishes a voltage representing the beat phenomenon due to the Doppler effect between the signal emitted by the oscillator 7 and the echo signal from the transponder oscillator 1. This voltage is applied to a modulator 12 and serves to amplitude-modulate a HF oscillator 13 which emits waves of frequency $f$. The oscillator 13 is connected to the ultra-high frequency oscillator 7 through a modulator 14 and amplitude-modulates the waves emitted by the ultra-high frequency oscillator 7 by means of the signal furnished by the said high-frequency oscillator 13, which thus functions as a sub-carrier generator.

The ultra-high frequency oscillator 7, the waves of frequency F from which are amplitude-modulated at the frequency $f$, emits waves of frequency $F-f$, F and $F+f$, and these waves are themselves amplitude- modulated at the Doppler effect beat frequency $f_b$.

Referring now to FIG. 2, it will be seen that the ground station comprises a conventional receiver 15 tuned to the frequency of one of the ultra-high frequency transmitter sidebands, for instance to $F+f$, said receiver being connected to an antenna 16 located at the point whereat it is desired to effect the distance measurement. The output voltage of the receiver 15 is applied to a recording unit 17.

In this miss-distance indicator, the Doppler effect is utilized in combination with the echoes received. Through the instrumentality of its ultra-high frequency oscillator 7, the target transmits to the missile, located at a distance $r$, waves of the form:

$$C_1 = A.e^{j\omega t}$$

Calculation indicates that the wave retransmitted by the missile oscillator 1 and received by the target antenna 8 at a distance $r$ from the missile is of the form:

$$C_2 = A \frac{\sigma \Sigma}{16\pi^2 r^4} e^{j\omega \left(t - \frac{2r}{c}\right)}$$

where $\sigma$ and $\Sigma$ are the effective pick-up areas of the antennae 6 and 8, as used in the receiving mode, and $c$ the wave propagation velocity.

Considering now the Fresnel diagram shown in FIG. 3, it will be seen that a beat phenomenon is set up between the waves $C_1$ and $C_2$. The resultant vector C passes through a maximum and a minimum at the frequency:

$$f_b = \frac{2}{\lambda} \cdot \frac{V_R^2 t}{\sqrt{d^2 + V_R^2 t^2}},$$

where $V_R$ is the radial velocity of the missile relative to the target, $d$ the length of the perpendicular dropped from the target onto the radial velocity vector and $\lambda$ the wavelength. When $t$ is very large, whether in positive or negative value, $f_b$ tends, as is well known, toward $$\frac{2V_R}{\lambda}$$

This frequency $f_b$ is that specifically utilized to amplitude-modulate the sub-carrier which is emitted by the high frequency oscillator and which in turn amplitude-modulates the carrier emitted by the UHF oscillator 7.

If reference be now had to FIG. 4, which illustrates in detail the equipment of the target C shown in FIG. 2, it will be seen that the ultra-high frequency oscillator 7 comprises a triode 18 the grid circuit of which is provided with a by-pass capacitor 19 and a resistor 20, and the tank circuit with an inductor 21 and a capacitor 22. The detector 9 is provided with an impedance matching resistor 23 and a detecting diode 9a and receives two signals, one of which is furnished by the oscillator 7 and the other by the wave transmitted by the missile and received by the antenna 8. The signal detected thus at the chopping frequency $Fd$ is amplified by the triode 24 of the amplifier 10, said amplifier 10 being tuned to this frequency $Fd$ by its resonant circuit 25. The ensuing signal is transmitted by the transformer 26 to the detector 11 which is provided with a detecting diode 27, and said detector furnishes the Doppler signal of frequency $f_b$ which is carried by the sub-carrier frequency $Fd$ resulting from the chopping by the super regenerative oscillator 1.

The signals thus detected are received by the coupling transformer 28 of modulator 12 and applied to the tank circuit 29 of the high frequency oscillator 13 which is provided with a triode 30 for amplitude modulation of the waves emitted by oscillator 13 at a frequency $f$. The signals modulated by the modulator 14 are applied to the tank circuit of ultra-high frequency oscillator 7 to amplitude-modulate the waves of frequency F emitted by the same. In short, the ultra-high frequency oscillator 7 emits waves of frequency F, $F+f$ and $F-f$ which are each amplitude-modulated at the Doppler effect beat frequency $f_b$. Of this set of waves, only those of frequency F are capable of synchronizing the waves emitted by the transponder oscillator 1, the free-running frequency of which is equal, precisely, to F.

As shown in FIG. 5, the ground receiver 15 comprises a tuning stage 31 connected to the antenna 16 and a detector stage with detecting diode 32 linked to the measuring unit 17. The receiver 15 is tuned to one of the sidebands of the set of waves emitted by the ultra-high frequency oscillator 7, for example to the frequency $F+f$. In actual fact, these waves of frequency $F+f$, amplitude-modulated at the Doppler beat frequency $f_b$, are constituted by a set of waves of respective frequency $F+f$, $F+f+f_b$ and $F+f-f_b$, so that the distance between the missile and the target can be determined by applying the classic formulae for utilization of the Doppler effect. This calculation may be readily made.

More particularly, the Doppler-Fizeau information is recorded on the recording unit 17, which may be a conventional recorder which plots frequency versus time, of FIG. 2. Accordingly, such a recorder would produce the curve of the Doppler-Fizeau frequency $f_b$ as a function of time.

When the missile is far away from the target, $f_b$ has the value $$f_{b\infty} = \frac{2V_R}{\lambda} \quad (I)$$

where $V_R$ is the speed of the missile with respect to a system of axes of co-ordinates connected to the target. Said speed is constant in the time interval under consideration. $\lambda$ is the wave-length of the connection, i.e., $C/F$, C being the speed of propagation of the wave. Equation I gives $V_R$.

When the missile passes at the minimal distance from the target, $f_b$ is cancelled out. This point is taken as origin of the periods.

At any given instant $t$, the distance $d_t$ from missile to target is given by the known equation:

$$d_t = \frac{2V_R^2 t}{\lambda f_b} \quad (2)$$

in which all terms are known:

$V_R$ is given by (I);

$t$ is measured by the distance on the recording from the point considered to the point $f_b = 0$;

$\lambda$ is known by construction, i.e. parameters built into the apparatus; and $f_b$ is read on the recording.

A specific application of this invention involves measurement of the minimum distance $d$ between two bodies, of which at least one is in motion. In this case, the distance cannot be obtained from a reading on a measuring instrument; it requires computations which may be effected in either of the following two ways:

(1) By hand, by studying the zeros on the plot of the signals received by the receiver 15, after a recording thereof has been made by a recorder placed at the receiver output.

(2) By means of a computer of any suitable type capable of solving the equation $$d = K \left( \int_0^\infty f_{b\infty} dt - \int_0^\infty f_b dt \right) \quad (3)$$

where K is a coefficient dependent upon the transmission frequency F, $f_b$ the Doppler beat frequency at a given instant $t$, and $f_{b\infty}$ the Doppler beat frequency when the two bodies are at a very great distance from each other.

When it is desired to know the minimum distance $d$ to which the missile has come near the target, the Equation 2 drops out, for its numerator is zero because $t=0$, and its denominator is zero because $f_b$ is then also zero.

In order to overcome the indetermination, the recording, a typical representation of which is shown in FIG. 6 is used as follows:

Equation 3 may be written:

$$d = K \int_0^\infty (f_{b_\infty} - f_b dt) \quad (4)$$

$$K = \frac{\lambda}{2} = \frac{C}{2F} \quad (5)$$

As regards $$\int_0^\infty (f_{b_\infty} - f_b) dt$$

this is merely the shaded or hatched area in the FIGURE 6. It can be planimetrically determined by hand by any known method.

It is possible for any of a large number of automatic apparatus to carry out the above integration. For example, if, in lieu of the recording unit 17, a conventional frequency meter is employed which gives a continuous current proportional to the frequency, it can be arranged so that said apparatus is at zero when the measuring is started, i.e. when $f_b = f_{b_\infty}$.

Consequently, the current supplied by said frequency meter will be proportional to $f_{b_\infty} - f_b$.

If said current is introduced into an integrator, the latter will give the function:

$$\int_{-\infty}^t (f_{b_\infty} - f_b) dt$$

When the missile has again moved well away from the target, the integrator will give:

$$\int_{-\infty}^{+\infty} (f_{b_\infty} - f_b) dt = 2 \int_0^{+\infty} (f_{b_\infty} - f_b) dt$$

or $4d/\lambda$, hence $d$.

The miss-distance indicator of this invention offer numerous advantages with respect to presently utilized methods and devices. The electronic equipment used is extremely simple, and the number of electron tubes required to implement it is in particular very much smaller than the number used in equipment resorted to heretofore. In addition, the device according to the invention could only with difficulty be subjected to jamming, for such jamming could be effective only if it were able to simultaneously reproduce the various parameters of the radio link, to wit the chopping frequency of the wave retransmitted by the missile, the frequencies, and the amplitude modulations notably sustained under the effect of the sub-carrier wave emitted by the high frequency oscillator.

What we claim is:

1. A miss-distance indicator for measuring, at a given point, the distance between two bodies of which one at least is in motion, comprising, in combination, on one of said bodies, a transponder which is sensitive to a determinate frequency within the range of the ultra high frequencies; on the other body, an ultra-high frequency oscillator emitting waves of a frequency equal to said determinate frequency, a receiving/transmitting antenna connected to said ultra-high frequency oscillator, a high frequency oscillator, means connected to said antenna for detecting the Doppler beat frequency between the signals emitted by said ultra-high frequency oscillator and the echo signals from the transponder, means for amplitude-modulating with the Doppler beat detection voltage the signals emitted by said high frequency oscillator, and means for amplitude-modulating with said high frequency oscillator the signals emitted by said ultra-high frequency oscillator; and, at the given measurement point, a receiving antenna, a receiver connected to said receiving antenna and tuned to the frequency of one of the sidebands of the signals emitted by said ultra-high frequency oscillator, and means adapted to connect the output of said receiver to a measuring unit.

2. A miss-distance indicator for measuring, at a given point, the distance between two bodies of which one at least is in motion, comprising, in combination, on one of said bodies, a transponder having a super regenerative oscillator of predetermined free-running frequency within the range of the ultra high frequencies, a receiving/transmitting antenna connected to said super regenerative oscillator, and a chopping generator coupled to said oscillator for chopping the oscillations thereof; on the other body, ultra-high frequency oscillator emitting waves of frequency equal to the free-running frequency of said super regenerative oscillator, a receiving/transmitting antenna connected to said ultra-high frequency oscillator, a detector of the signals which are emitted by said ultra-high frequency oscillator and originate by an echo process from super regenerative oscillator of said transponder, for furnishing a signal of frequency equal to the chopping frequency of said signals, an amplifier tuned to said chopping frequency and connected to said detector, a second detector connected to said amplifier for furnishing a voltage representing the Doppler beats between the signals emitted by the ultra-high frequency oscillator and the echo signals from said transponder, a high frequency oscillator, a modulator interposed between said high frequency oscillator and said second detector for amplitude-modulating the signals from said high frequency oscillator, and a second modulator interposed between said high frequency oscillator and said ultra-high frequency oscillator for amplitude-modulating the signals from said ultra-high frequency oscillator; and, at the given measurement point, a receiving antenna, a receiver connected to said receiving antenna and tuned to the frequency of one of the sidebands of the signals emitted by said ultra-high frequency oscillator, and a measuring unit to which the output voltage from said receiver is applied.

3. A miss-distance indicator as claimed in claim 2, wherein said measuring unit is a counter.

4. A miss-distance indicator as claimed in claim 2, wherein said measuring unit is a recorder.

5. A miss-distance indicator as claimed in claim 4, wherein scrutiny of the zeros on the plot of the recorded signals permits computation of the minimum distance between the two bodies.

6. A miss-distance indicator as claimed in claim 2, wherein said measuring unit is a computer.

7. A miss-distance indicator as claimed in claim 6, wherein the computer is capable of solving an equation representing the product of a coefficient dependent upon the ultra-high frequency oscillator emission frequency multiplied by the difference between the definite integrals between zero and infinity, with respect to time, of the Doppler beat frequencies when the two bodies lie at a great distance from each other and at a given instant, with a view to determining the minimum distance between said two bodies.

8. A miss-distance indicator for measuring, at a fixed ground station, the distance of passage of a moving body comprising, in combination, on said moving body, a transponder which is sensitive to a determinate frequency within the range of the ultra-high frequencies; and, at the fixed ground station, an ultra-high frequency oscillator emitting waves of frequency equal to said determinate frequency, a receiving/transmitting antenna connected to said ultra-high frequency oscillator, a high frequency oscillator, means connected to said antenna for detecting the Doppler beat frequency between the signals emitted by said ultra-high frequency oscillator and the echo signals from the transponder, means for amplitude-modulating with the Doppler beat detection voltage the signals emitted by said high frequency oscillator, means for amplitude-modulating with said high frequency oscillator the signals emitted by said ultra-high frequency oscillator, a receiving antenna, a receiver connected to the same and tuned to the frequency of one of the sidebands of the signals emitted by said ultra-high frequency oscillator, and a measuring unit to which the output voltage from said receiver is applied.

9. A miss-distance indicator for measuring, at a fixed ground station, the distance of passage of a moving body comprising, in combination, on said moving body, a transponder having a super regenerative oscillator of predetermined free-running frequency within the range of the ultra high frequencies, a receiving/transmitting antenna connected to said oscillator, and a chopping generator coupled to said oscillator for chopping the oscillations thereof; and, at the fixed ground station, an ultra-high frequency oscillator emitting waves of frequency equal to the free-running frequency of said super-feedback oscillator, a receiving/transmitting antenna connected to said ultra-high frequency oscillator, a detector of the signals which are emitted by said ultra-high frequency oscillator and originate by an echo process from the super regenerative oscillator of said transponder for furnishing a signal of frequency equal to the chopping frequency of said signals, an amplifier tuned to said chopping frequency and connected to said detector, a second detector responsive to said amplifier for furnishing a voltage representing the Doppler beats between the signals emitted by said ultra-high frequency oscillator and the echo signals from the super regenerative oscillator of said transponder, a high frequency oscillator, a modulator interposed between said high frequency oscillator and said second detector for amplitude-modulating the signals from said high frequency oscillator, a second modulator interposed between said high frequency oscillator and said ultra-high frequency oscillator for amplitude-modulating the signals from said ultra-high frequency oscillator, a receiving antenna, a receiver connected to said receiving means and tuned to the frequency of one of the sidebands of the signals emitted by said ultra-high frequency oscillator, and a measuring unit to which the output voltage from said receiver is applied.

References Cited by the Examiner
UNITED STATES PATENTS
2,992,422   7/61   Hayes _____ 343—6

CHESTER L. JUSTUS, *Primary Examiner.*